United States Patent [19]

Badenhop

[11] Patent Number: 4,615,178
[45] Date of Patent: Oct. 7, 1986

[54] APPARATUS AND METHOD FOR CONTROLLING A VACUUM COOLER

[76] Inventor: Stanley Badenhop, 129 Bradford Ave., Napoleon, Ohio 43525

[21] Appl. No.: 679,684

[22] Filed: Dec. 10, 1984

[51] Int. Cl.[4] ............................................. F25B 19/00
[52] U.S. Cl. ...................................... 62/100; 62/169; 62/268
[58] Field of Search ................. 62/169, 170, 100, 191, 62/268, 269, 270; 34/5, 15, 51, 92; 426/524; 73/73

[56] References Cited

U.S. PATENT DOCUMENTS

| | | | |
|---|---|---|---|
| 2,585,086 | 2/1952 | Brunsing | 62/100 X |
| 2,699,048 | 1/1955 | Brunsing | 62/100 |
| 3,145,562 | 8/1964 | Hamilton et al. | 34/92 |
| 3,176,408 | 4/1965 | Fuentevilla | 34/92 X |
| 3,219,463 | 11/1965 | Lamb | 62/100 X |
| 4,115,596 | 9/1978 | Knutrud | 62/100 X |
| 4,204,408 | 5/1980 | Dawson | 62/170 X |

Primary Examiner—Harry Tanner
Attorney, Agent, or Firm—David D. Murray

[57] ABSTRACT

An apparatus and method for vacuum cooling produce and similar foodstuffs includes a vacuum cooling chamber, a vacuum pump, refrigeration equipment and data processing equipment which is provided with various data by the operator, weight and pressure sensors within the cooling chamber and appropriately controls and terminates the operating cycle of the equipment. The method generally includes determining the initial weight and average temperature of the produce, calculating the amount of heat removal necessary to lower the temperature of the produce to a predetermined final temperature, calculating the amount of water to be removed to accomplish the desired heat removal and subjecting such produce to a vacuum to vaporize the quantity of water from such produce, such quantity of water having a heat of vaporization sufficient to achieve the previously calculated heat removal.

22 Claims, 8 Drawing Figures

APPARATUS AND METHOD FOR CONTROLLING A VACUUM COOLER

BACKGROUND OF THE INVENTION

The invention relates generally to vacuum cooling processes and more specifically to a method of and apparatus for vacuum cooling processing of produce and similar foodstuffs.

The vacuum cooling of foodstuffs is a technique developed approximately forty years ago wherein produce, particularly such succulent items as lettuce are subjected to a vacuum which effects vaporization of a certain portion of the water contained therein and thus cooling of the produce. Much early development in this technological area was done by Morris Kasser and is related in U.S. Pat. Nos. 2,344,151 and 2,651,184. The former patent teaches a vacuum chamber wherein pressurized steam is utilized to produce a vacuum as well as a thermostatic controller which senses dry bulb temperature and terminates the vacuum cooling cycle when the temperature of the chamber reaches a preset level. Since the time of this patent, it has become known that sensing dry bulb temperature is not an accurate manner in which to determine the actual temperature of the produce since such temperature is affected by water evaporation which, of course, does not take place with and is not sensed by a conventional dry bulb thermometer or a thermostat.

This shortcoming was realized and a solution thereto is disclosed in U.S. Pat. No. 2,585,086. Here, a thermometer bulb is surrounded by a wick which is kept saturated throughout the cooling process. The thermometer thus senses an approximation of the temperature of the product as moisture is vaporized therefrom. It is apparent, however, that the characteristics of a saturated wick wet bulb thermometer will vary from those conditions and temperatures exhibited by actual produce and that such a temperature sensing method will provide much improved performance over a dry bulb temperature sensing scheme though it, too, is not wholly accurate.

Other apparatus and methods have been developed to monitor the ongoing cooling process as a means of determining the appropriate termination point. One such approach is disclosed in U.S. Pat. No. 4,204,408. In this disclosure, dimensional change resulting from the vaporization of water from foodstuffs is sensed and utilized to determine an appropriate cooling rate.

The foregoing discussion suggests that if the temperature of produce or foodstuffs could be accurately determined during an evaporation cycle, determination of the appropriate termination point of the cooling cycle could be achieved. This is not completely true. First of all, the temperature of the produce can vary from location to location within the cooling chamber. Secondly, and more importantly, is the temperature differential existing between the outside and the inside of a particular foodstuff such as head lettuce. Typically, the outer surface of lettuce will cool somewhat more rapidly than the inner surfaces and interior and thus exhibit a somewhat lower temperature than the inner surfaces during the greater part of the cooling cycle. Finally, differences in the evaporative cooling rates of various produce, will affect the cycle time and to a lesser extent, the temperature uniformity of the produce. Such differences are the result of both the mass to surface ratio of the produce and the ability of that surface to give up moisture. For example, since head lettuce releases its water relatively rapidly, cooling to achieve a given temperature can be performed somewhat more rapidly than on larger, more dense vegetables such as carrots which may have their exterior surfaces cooled to a desired temperature relatively rapidly but which may cool internally much more slowly and thus exhibit both significant temperature gradients as the cooling process nears an end and may further warm significantly after the process has been terminated.

It should also be noted that most produce is exceptionally sensitive to even brief freezing and that significant precautions must be made in order to ensure that under no circumstances does the vacuum and corresponding wet bulb (evaporative) temperature within the vacuum chamber drop to a point that freezing occurs.

The foregoing properly suggests that the control of vacuum cooling processes requires careful and skilled operator attention in order to properly control the duration of the vacuum cooling cycle, the maximum vacuum and the minimum temperature achieved. One approach to ensuring safe cooling cycles is to perform what may be considered partial cycles, read the temperature of such produce by various temperature sensing units disposed within the produce itself, after having allowed the temperature to stabilize and repeating partial cycles at increasingly deeper vacuums until such desired minimum temperature is achieved. Such an approach can extend the per load cycle time from an average of between 15 and 20 minutes to twice these times or more. Such an approach has an obvious deleterious effect on the capacity of a given vacuum chamber and thus may necessitate the purchase of additional units, ultimately resulting in an increase in operating costs.

From the foregoing, it can be appreciated that minimum cycle times are desirable since they will maximize capacity of a given vacuum chamber. But is is also apparent that such minimum cycle times can be achieved only through careful control of the vacuum process unless uneven cooling or freezing of produce and foodstuff damage is to occur. It is apparent, therefore, that improvements in the art of vacuum cooling methods and apparatus are both possible and desirable.

SUMMARY OF THE INVENTION

The instant invention relates to an apparatus and method for vacuum cooling produce such as lettuce, cabbage, spinach, celery, and numerous other vegetables and foodstuffs. The apparatus includes a vacuum cooling chamber, a vacuum pump, refrigeration equipment, and a controller, such as a microprocessor. Data is provided to the microprocessor by the operator, means disposed within the vacuum chamber for continuously monitoring the weight of the product, and means disposed within the vacuum chamber for continuously monitoring the pressure within the vacuum chamber. The microprocessor automatically controls and terminates the vacuum cycle of the vacuum cooler.

The method generally includes the steps of determining the initial weight of a product loaded within the vacuum chamber and monitoring this weight throughout the vacuum cooling process, determining the temperature of the produce at the beginning of the vacuum cooling process by monitoring the flash point temperature of a heated liquid bath and determining the inflection point of the boiling point temperature versus time relationship of the liquid bath which indicates the attainment of a chamber vacuum equivalent to the vapor pressure of the water contained within the produce indicating that vacuum cooling of the produce has begun. Alternatively, either the inflection point of the rate at which the pressure within the vacuum chamber lowers or the point of increase of cooling load on the vapor condensers (refrigeration system evaporators) disposed with the vacuum chamber may be sensed directly to determine the initial temperature of the produce. The desired final temperature of the produce is supplied manually to the microprocessor by the operator through any conventional data entry device as well as information regarding the specific heat of the produce and any safe minimum temperature, especially if it is significantly distinct from the desired final temperature.

Given this information, the microprocessor calculates the amount of heat which must be removed in order to lower the temperature of the produce to such predetermined final temperature and further calculates the weight loss of the produce which corresponds to such heat removal. The microprocessor then continuously monitors the lessening weight of the produce as it is cooled by vaporization (boiling) of its water content, iteratively calculates the remaining quantity of water which must be removed in order to achieve the desired final temperature of the produce and finally, terminates the cooling process.

Thus it is an object of the instant invention to provide an apparatus for automatically vacuum cooling produce and similar foodstuffs to a desired final temperature.

It is a further object of the instant invention to provide an apparatus for use in conjunction with a vacuum cooler which accurately monitors the flash point temperature within the vacuum cooler during the vacuum cooling process.

It is still further object of the instant invention to provide a vacuum cooling apparatus having weight detecting means for weighing the produce disposed within the vacuum cooling chamber.

It is a still further object of the instant invention to provide an apparatus for use in conjunction with a vacuum cooler which monitors produce weight and terminates the vacuum cooling cycle at a desired produce temperature.

It is a still further object of the instant invention to provide a vacuum cooling method wherein the initial weight and temperature of the produce is utilized to control the vacuum cooling process.

It is a still further object of the instant invention to provide a method for vacuum cooling produce which includes compensation for various specific heats of products.

It is a still further object of the instant invention to provide a method of vacuum cooling which is substantially automatic and which vacuum cools produce rapidly.

Further objects and advantages of the instant invention will become apparent by reference to the following description of the preferred embodiment and attendant drawings.

DESCRIPTION OF THE PREFERRED EMBODIMENT

Figure 1:
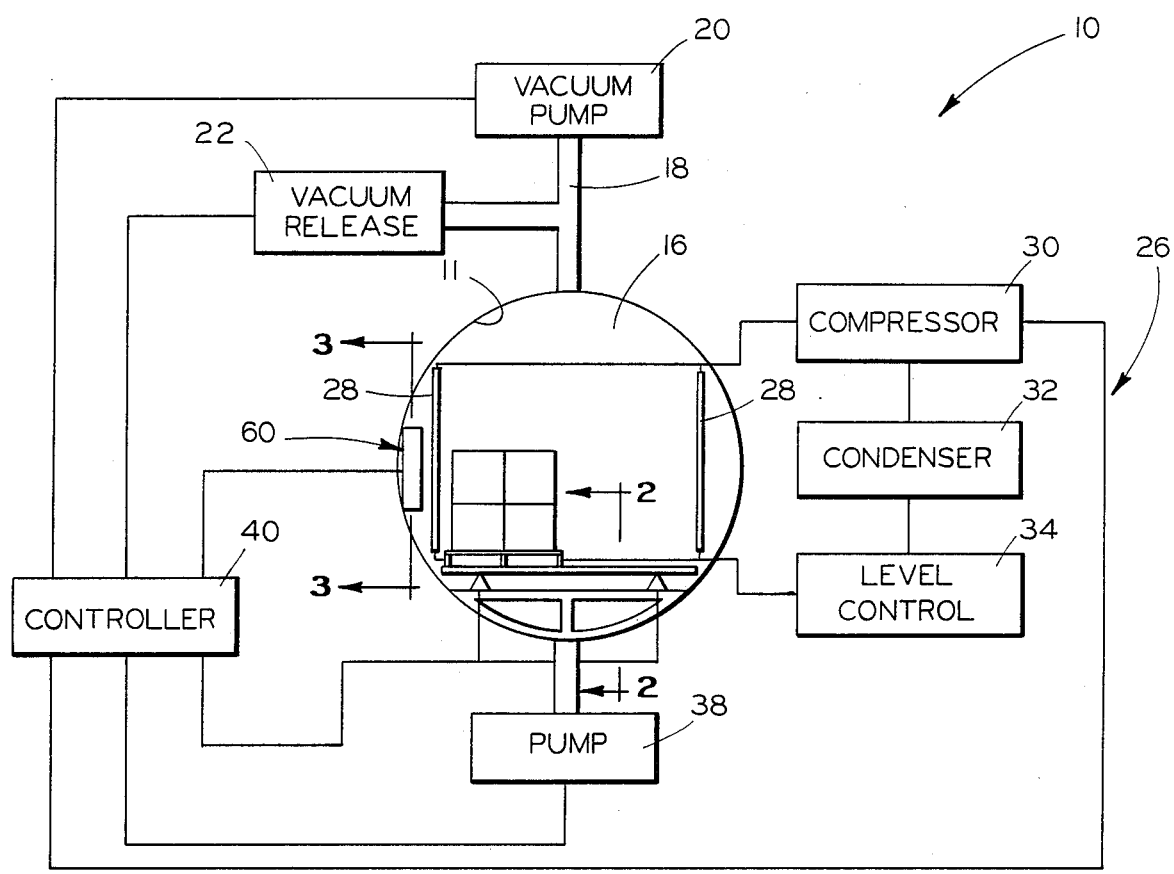
FIG. 1 is a schematic view of a vacuum cooler chamber and associated equipment according to the instant invention.

Referring now to FIG. 1, a vacuum cooler and control assembly according to the instant invention is generally schematically illustrated and designated by the reference numeral 10. The vacuum cooler and control assembly 10 includes an elongate, typically circular chamber wall 12 and at least one access opening such is a door 14, which may be hinged or pivoted to the chamber wall 12 according to conventional practice. The chamber wall 12 is of sufficient thickness and is reinforced in order to withstand significantly reduced internal pressures on the order of but a few millimeters of mercury. The chamber wall 12 may, of course, define a cross section other than circular, such as square or rectangular. Inasmuch as such chambers are deemed to be well known in the prior art, it will not be further described. The chamber wall 12 defines an internal region or chamber 16 of sufficient volume to receive a quantity of produce to be vacuum cooled. Communicating through a vacuum line 18 with the chamber 16 is a vacuum pump 20 which is capable of relatively rapidly exhausting the air within the chamber 16, thereby reducing the pressure therein, as noted previously, to but a few millimeters of mercury. Also communicating through the vacuum line 18 with the chamber 16 is a vacuum release mechanism 22 which may be selectively activated to establish communication between the chamber 16 and the atmosphere, thereby refilling the chamber 16 with air at atmospheric pressure when the cooling cycle is terminated, as will be more fully described below. The vacuum release mechanism 22 may, of course, be located on or immediately adjacent the chamber 16.

The vacuum cooling and control assembly 10 further comprises a refrigeration assembly 26. The refrigeration assembly 26 includes a pair of evaporators 28 which may take the form of elongate coils 28 disposed on opposite internal surfaces of the chamber wall 12. The outlets of the evaporator coils 28 are connected to the inlet of a conventional compressor 30 which has a condenser 32 communicating with its outlet. The condenser 32 is preferably a fan-forced unit, though it may be any other type such as a water cooled unit, if desired. Condensed, high pressure liquid from the condenser 32 is provided to a level control 34 which monitors the level of refrigerant within the evaporator coils 28 and adjusts the level accordingly. In the refrigeration assembly 26, due to the temperature range encountered, ammonia is the preferred refrigerant as those familiar with such technology will readily appreciate. Other refrigerants may, however, be utilized. A sump pump 38 communicates with the lower internal region of the chamber 12 and removes water condensed by the evaporator coils 28. The various components of the vacuum cooling and control assembly 10, which are typically electrically driven, are under the control of a central controller 40. The controller 40 which is also illustrated in FIG. 4, receives data from various inputs and automatically and completely controls the overall operation of the vacuum cooler.

Figure 2:
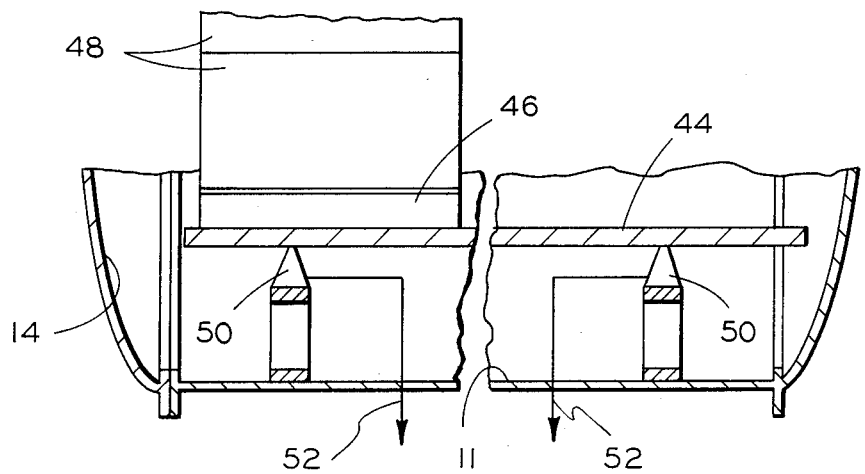
FIG. 2 is a fragmentary, sectional view of a portion of a vacuum cooler chamber having a platform supported by a plurality of load cells according to the instant invention which is taken along line 2—2 of FIG. 1.

Referring now to FIGS. 1 and 2, it will be appreciated that within the lower portion of the internal region 16 and supported by the chamber wall 12 is disposed a horizontal platform 44. The platform 44 extends substantially the full length of the chamber 16 and is arranged to receive a plurality of pallets 46 carrying a plurality of cartons 48 of produce. The entire platform 44 is supported by a suitably arranged plurality of load cells 50. The load cells 50 may be of a strain gauge or piezo crystal configuration or functionally equivalent construction and provide signals in lines 52 to the controller 40 representative of the weight of the produce, cartons 48 and pallets 46 disposed upon the platform 44. This information is utilized to control the vacuum cooling cycle, as will be more fully described subsequently.

Figure 3:
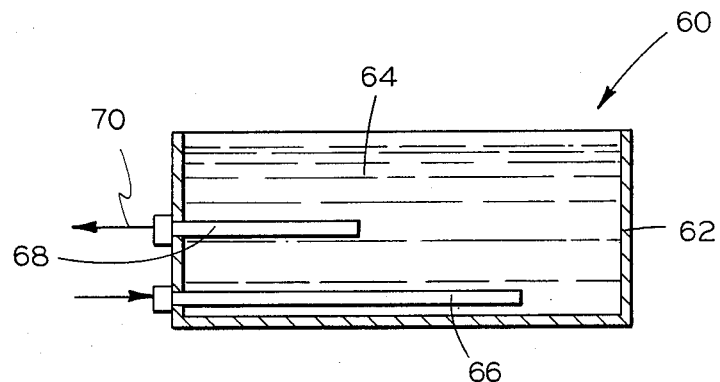
FIG. 3 is a full, sectional view of a thermometer bath according to the instant invention taken along line 3—3 of FIG. 1.

With reference now to FIGS. 1 and 3, it will be appreciated that there is disposed in the internal region 16 and on the inner surface of the chamber wall 12, a pressure sensing assembly 60 comprising a tank 62 filled with a liquid 64. The boiling point versus pressure relationship of the liquid 64 must be known throughout the range of pressure to be experienced during the cooling cycle of the produce. Due to its availability, water is the preferable liquid 64, though numerous other liquids are also suitable. If the liquid 64 is water, it may be supplied from condensation on the evaporator coils 28, if desired. The assembly 60 includes a heating element 66 which is submerged within the liquid 64 and is electrically energized to heat the liquid 64. Although the power input to the liquid 64 by the heater 66 is not critical, it has been found preferable to size the heater 66 in the range of approximately 400 to 600 watts in order to relatively quickly heat the relatively small quantity (approximately one quart) of liquid in the chamber 62. Also disposed within the liquid 64 contained within the chamber 62 is a thermometer 68 which preferably is of a variable resistance (thermistor) type such that it provides a signal corresponding to the temperature of the liquid 64 within the bath in an electrical line 70. The signal contained in the line 70 is supplied to the controller 40 as illustrated in FIG. 4. It should be understood that while the pressure sensing assembly 60 provides a signal representative of the temperature of the liquid 64, it is, in effect, providing information about, and is utilized to, determine the pressure within the chamber 16. The pressure sensing assembly 60 provides certain advantages such as good accuracy in the pressure range critical to the operation of the assembly 10, that is, below about 10 millimeters of mercury. It should be understood that a conventional pressure transducer having an analog or digital output and good accuracy in the above noted pressure range may also be utilized. The purpose of the pressure sensing assembly 60 will be more fully described below.

Figure 4:
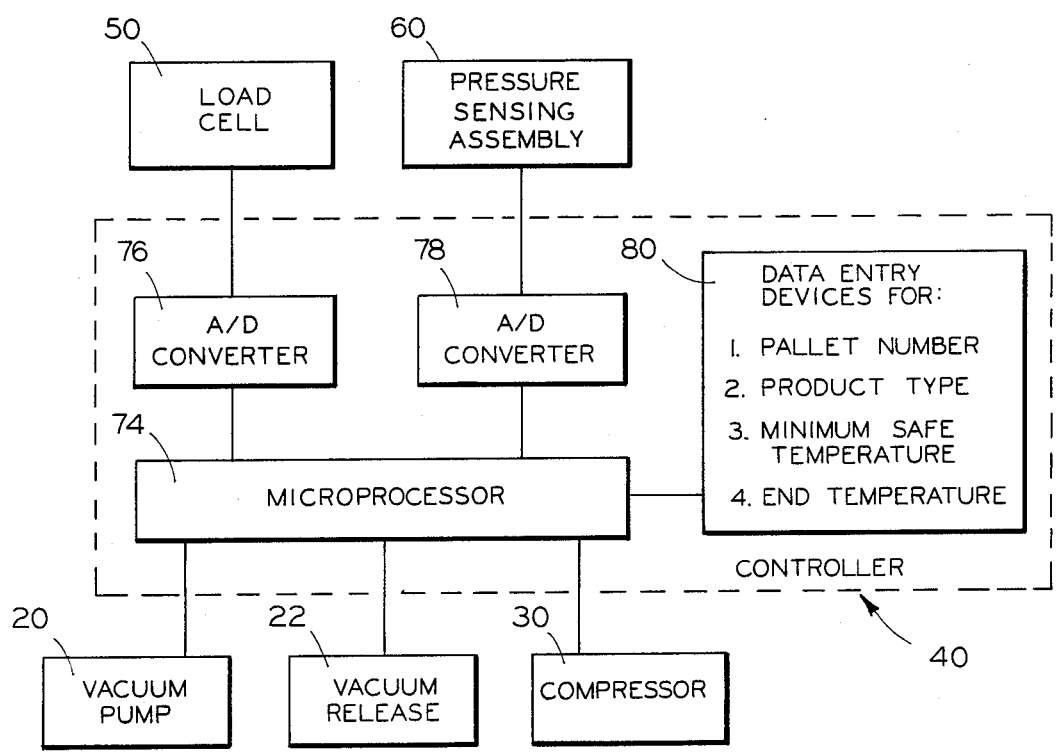
FIG. 4 is a diagrammatic view of a controller for a vacuum cooler chamber according to the instant invention.

Referring now to FIG. 4, the controller 40 includes various data sensors and inputs relating to the operation of the vacuum cooler and control assembly 10 and provides control outputs to various components. Specifically, the controller 40 includes a microprocessor 74 which receives digital information from an analog to digital converter 76 which is driven by the output of the load cells 50. Likewise, the microprocessor 74 receives digital information from an analog to digital converter 78 which is driven by the output of the thermometer 68 within the pressure sensing assembly 60 or, alternatively, may receive analog information from a pressure transducer. A pressure transducer having a digital output may, of course, drive the microprocessor 74 directly. The microprocessor 74 also receives manually entered data from an input or data entry device 80 such as a keypad, thumb switches, selector switches or the like. Specifically, the operator of the vacuum cooling and control assembly 10 provides the microprocessor 74 with information relating to the number of pallets 46 placed upon the platform 44 within the vacuum chamber 16. Information relating to pallet number is utilized by the microprocessor 74 to calculate the net weight of the produce within the vacuum chamber 12 during a given cycle by subtracting the total weight of the pallets 46 which are assumed to be relatively uniform. Data is also manually entered on the entry device 80 relating to the type of produce placed in the vacuum chamber 16. This information is utilized by the microprocessor 74 and permits it to provide the proper specific heat of the produce during various calculations which are utilized to control the overall cooling process. Data relating to the desired final temperature of the produce is entered as well as a minimum safe temperature if such temperature is significantly different from the desired final temperature. Should the temperature of the produce be reduced to the minimum safe temperature entered into the entry device 80, the operation of the assembly 10 will be terminated.

As noted, the microprocessor 74 controls the overall operation of the vacuum cooling and control assembly 10. That is, the microprocessor 74 includes outputs which start and stop the compressor 30, as well as activate the vacuum pump 20 while closing the vacuum release 22 and vice versa. The microprocessor 74 also receives data and monitors and controls the overall operation of the assembly 10 for personnel safety, provides system and equipment failure safeties and provides diagnostic information.

The foregoing generally delineates the apparatus of the instant invention. The operation and process theory of the vacuum cooler and control assembly 10 will now be described with reference to FIGS. 5, 6, 7 and 8 and the operation of microprocessor 74 will be described with reference to FIG. 8. The overall operation of the vacuum cooler and control assembly 10 can be characterized as a process wherein the initial temperature and total net weight of the produce disposed within the chamber 16 are determined and a sufficient quantity of water is removed from the produce by vaporization at reduced pressure that the produce is cooled to a desired final temperature.

In order to accomplish this, the weight of the produce must be determined and then monitored during the cooling process. More specifically, the plurality of pallets 46 containing a larger plurality of cartons 48 of a given produce are transported by conventional means such as fork lift trucks into the chamber 16 of the assembly 10. Preferably, the pallets 46 are of a construction such that their weight is quite uniform. Newer pallets which may be injection molded from various plastic materials such as acrylonitrile butadiene styrene (ABS) and fiberglass reinforced plastic (FRP) are preferably used due to their relatively slight pallet to pallet weight variation. Assuming that the pallets 46 utilized have substantially uniform weights, this individual weight may be entered into the memory of the microprocessor 74 semi-permanently such that the operator of the controller 40 need only enter the number of pallets placed within the vacuum chamber 16 and the microprocessor 74 will compute the total weight of the pallets 46. Alternatively, if the weights of the pallets 46 vary greatly, the microprocessor 74 may be programmed to simply accept data from the entry device 80 relating to the total actual weight of the pallets 46. In order to determine such actual weight of the pallets 46, it is possible to simply load them onto the platform 44 without cartons of produce disposed thereon and utilize the load cells 50 within the chamber 16 to weigh the empty pallets 46. It will be apparent, however, that the use of standardized weight pallets 46, the weight of which is recorded in the microprocessor 74, assists both the accuracy and speed of the operating cycle by minimizing the amount of data required to be entered through the entry device 80 inasmuch as merely the total number of pallets 46 placed within the vacuum chamber 16 need be entered. Loading systems such as moveable platforms or conveyors which generally eliminate the use of pallets 46 may also be utilized, appropriate weight information, if necessary, being entered into the microprocessor 74.

When the platform 44 is loaded with pallets 46 of cartons 48 of produce, the load cells 50 generate signals in the lines 52 which are representative of the gross weight thereof. The microprocessor 74 then calculates the initial product weight by subtracting the weight of the pallets 46 from the gross weight sensed by the load cells 50. The microprocessor 74 may also be programmed to reduce the net produce weight by a fixed percentage, on the order of 1 to 2 percent to compensate for the weight of the cartons 48 and thereby further improve the accuracy of the cooling operation.

Next, information relating to the product type is provided to the microprocessor 74 through the data entry device 80. For reasons that will become more apparent subsequently, it is desirable to know the product type placed within the vacuum chamber 16 and, more specifically, the specific heat of the product type such that the amount of cooling needed to lower the temperature of the produce a given amount (which is dependent upon the specific heat of the produce) can be determined. Again, as a means of eliminating operator error, the simple and most direct means of entering the needed information is to select the name of the produce from a choice of positions on a rotary switch, thumb switch or keypad, each position corresponding to a different specific heat. An alternative to this form of data entry would be to directly enter the specific heat, which, of course, would require the operator to determine the correct specific heat from a reference chart or the like. Typically, the specific heat of vegetables and other produce ranges from about 0.90 to about 0.97. Lettuce, for example, which is mostly water, has a specific heat of about 0.96. As those familiar with this thermodynamic property will readily appreciate, this means that approximately 96% as much heat must be removed to lower the temperature of a pound of lettuce one degree as must be removed from one pound of water to lower its temperature the same amount. Since it is the temperature of the produce which is to be lowered, it is convenient to include this factor at this time as it facilitates subsequent calculations. The microprocessor 74 then combines the specific heat with the initial weight data by multiplication to provide a numerical quantity which is called effective weight.

Next, the minimum safe temperature and desired final or end temperature are entered through the entry device 80. If maximum cooling of the produce is desired, frequently, these temperatures will be substantially the same or identical. However, as a safety feature, the instant invention makes provision for entry of both desired final temperature and safe minimum temperature as indicated.

Since the effective weight of the produce within the vacuum chamber 16 and the desired final temperature are known, the equation $$W_e(T_1 - T_2) = Q$$

wherein $W_e$ is the effective weight, $T_1$ is the initial temperature, $T_2$ is the final temperature and $Q$ is the amount of heat to be removed requires only that the initial temperature be known in order to calculate in BTUs or other equivalent heat units what quantity of heat must be removed, it is apparent that the initial temperature ($T_1$) of the produce must also be determined.

Figure 6:
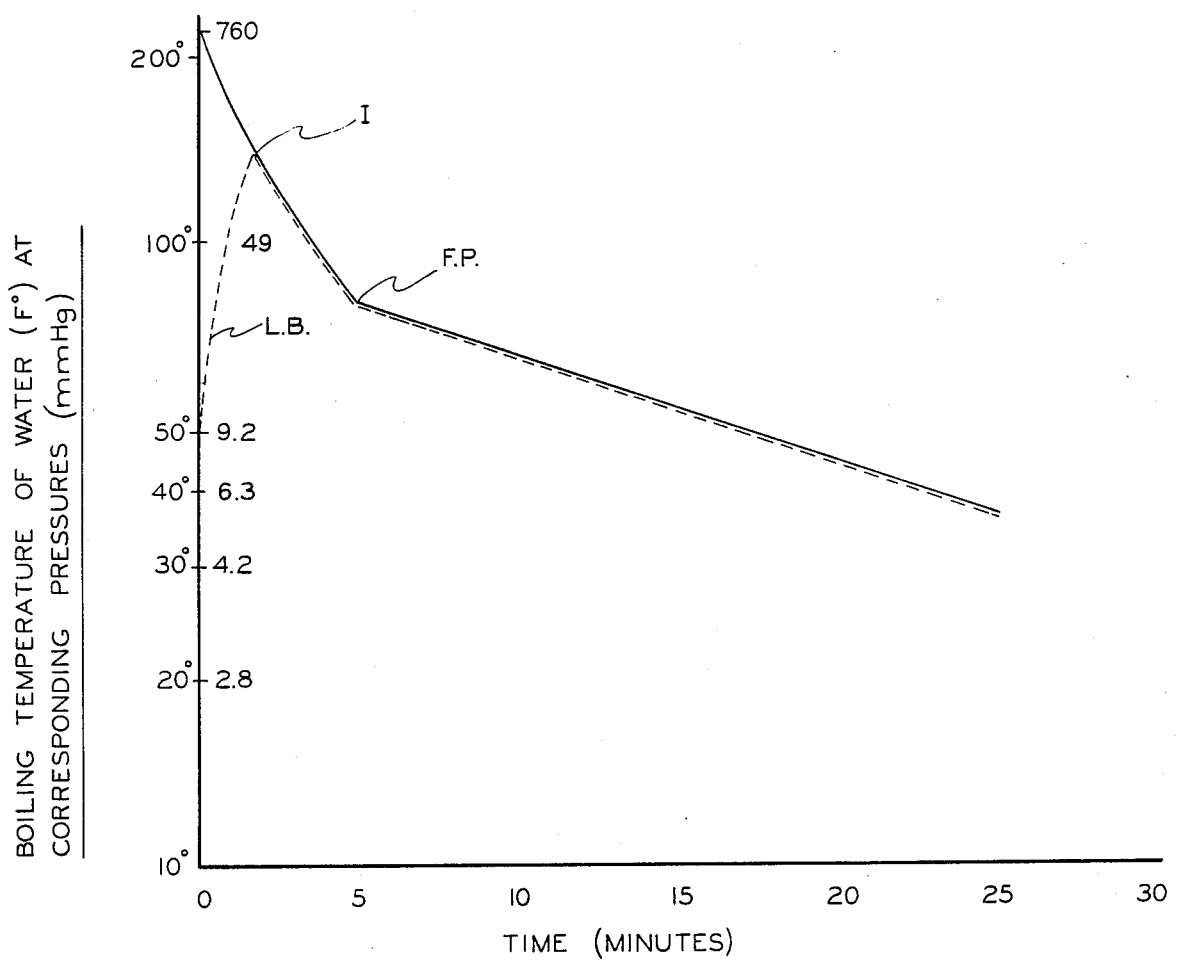
FIG. 6 is a graph which relates generally both pressure and corresponding water boiling point temperature along the vertical axis versus the cycle time along the horizontal axis during a typical vacuum cooling cycle.

Such initial temperature is determined by the pressure sensing assembly 60 and appropriate computing sections of the microprocessor 74. When the vacuum chamber 10 is closed and the vacuum pump 20 is activated, the pressure within the vacuum chamber 16 begins to drop relatively rapidly. At the beginning of the vacuum cooling cycle, the heater 66, in the pressure sensing assembly 60 is also activated. This initial rapid drop in pressure occurs because the vacuum pump 20 initially is merely evacuating air from the vacuum chamber 16. (At a later time when the pressure within the vacuum chamber 16 drops below that pressure corresponding to the temperature of the produce and the water contained therein, the produce water will begin to boil or vaporize, thereby loading the vacuum pump 20 and slowing the rate of pressure reduction.) Nonetheless, initially, and until such boiling pressure/temperature is reached, the vacuum within the chamber 16 will drop relatively rapidly as noted. Such rapid drop is illustrated in FIG. 6 in the left-most portion of the graph. Typically, approximately five minutes will elapse before the pressure within the vacuum chamber 16 drops to the corresponding boiling point temperature, although this figure will vary greatly with the size of the vacuum chamber 16, the capacity of the vacuum pump 20, and other variables. When the vacuum pump 20 is started, electrical energy is supplied to the heater 66 and begins to heat the liquid 64 contained therein relatively rapidly. The temperature of the pressure sensing assembly 60, the line designated L.B. in FIG. 6, will continue to rise until its temperature corresponds to the boiling temperature of the liquid at the pressure then existing within the vacuum chamber 16. At this point, designated I in FIG. 6, the temperature of the liquid 64, as sensed by the thermometer 68, will follow along the graph line of FIG. 6 which represents the boiling point of the liquid versus time at the pressure then existing within the vacuum chamber 16. Initially, of course, the change in temperature sensed by the thermometer 68 versus time is positive as indicated by the upward and rightward line labelled L.B. moving away from the vertical axis. Subsequent to the temperature of the pressure sensing assembly 60 achieving the boiling temperature at the corresponding pressure within the chamber 16, at point "I", the slope of the curve and thus the derivative dP/dt becomes negative. As the pressure within the vacuum chamber 16 continues to fall due to the action of the vacuum pump 20, the boiling point of the liquid 64 within the assembly 60 will likewise drop and be sensed by the thermometer 68.

This action will continue until such time as the pressure and thus the corresponding water boiling point temperature becomes equal to the temperature of the produce and the water contained therein. At this point, designated the flash point (F.P.) in FIG. 6, the slope of the pressure/temperature versus time graph will change rather significantly. The change in the slope, of course, is due to the incipient vaporization (boiling) of water from the produce which begins to load the vacuum pump 20 and the evaporator coils 28 of the refrigeration assembly 26 as alluded to earlier. If the differential dP/dt (slope) of the pressure/temperature versus time graph is less than (more negative) the fixed value of a negative constant K, the pressure (or the temperature) is merely recorded within the memory of the microprocessor 74 and the pressure/temperature is again sampled by the pressure sensing assembly 60 as illustrated in the flow chart of FIG. 8. As the operating condition within the vacuum chamber 16 passes through the flash point (F.P.) as illustrated in FIG. 6, this iterative calculation will determine that the differential of pressure versus time (dP/dt) has become more positive (or less in absolute value) than the negative constant K. At this time, the microprocessor 74 sets this pressure and its corresponding temperature, the flash point temperature, equal to the initial temperature $T_1$ required by the above-noted heat removal equation. This temperature represents an average produce temperature.

Alternatively, the microprocessor 74 may be programmed to determine the inflection point of the temperature/pressure versus time relationship by first determining the slope (Dp/dt) thereof during the evacuation of the chamber 16 before the flash point is reached. The slope of this line is relatively constant as noted. An abrupt change in the slope indicates that the flash point has been achieved. If desired, the slopes of the two lines may be extrapolated to a point of intersection which represents the boiling pressure and initial temperature of the produce. These calculations may be performed by conventional data logic and processing components as those familiar with such devices will readily appreciate.

As noted previously, the pressure may be secured directly with an appropriate transducer or the cooling load on the evaporator coils 28 may be sensed. Regardless of the sensing means utilized, an inflection point on the pressure/temperature versus time graph (FIG. 6) will be experienced when the pressure within the chamber 16 reaches the vapor pressure/temperature of the produce. The microprocessor 74 is programmed to sense such inflection point (the flash point) and sets this temperature equal to the initial produce temperature $T_1$.

At this time, all initial data necessary to properly operate the vacuum cooler and control assembly 10 according to the instant invention has been obtained and the equation $$W_e(T_1-T_2)=Q$$

can be solved for Q, the quantity of heat to be removed from the produce to lower its temperature from the initial temperature $T_1$ to the final temperature $T_2$. Since the amount of heat, Q, to be removed is a direct function of the heat of vaporization of water, the amount of weight to be removed from the produce will be related to the desired heat removal by such heat of vaporization. The simple formula $$Q/H=W_r$$

wherein Q is the calculated heat to be removed, H is the heat of vaporization of water and $W_r$ is the weight to be removed generally sets forth this relationship.

Figure 7:
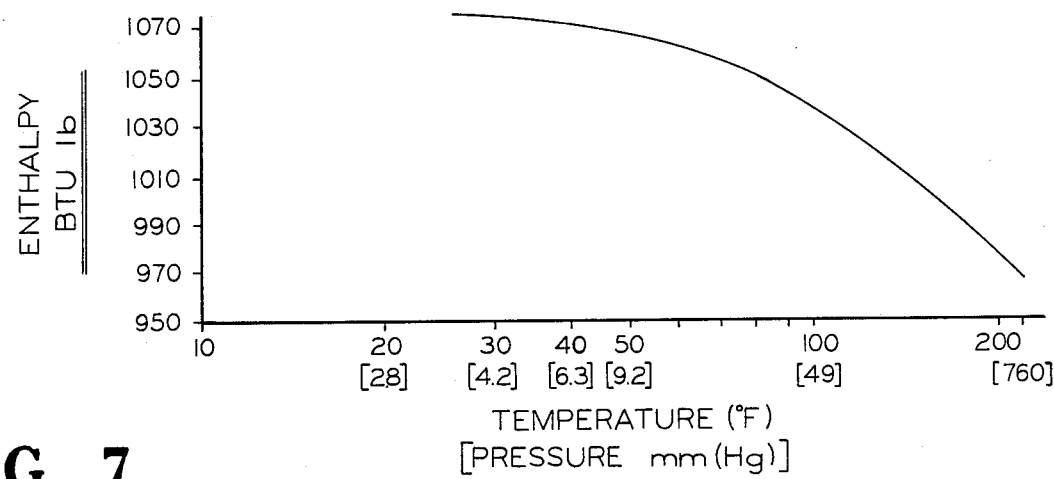
FIG. 7 is a graph which relates the change in the heat of vaporization (enthalpy) of water versus pressure.
Figure 8:
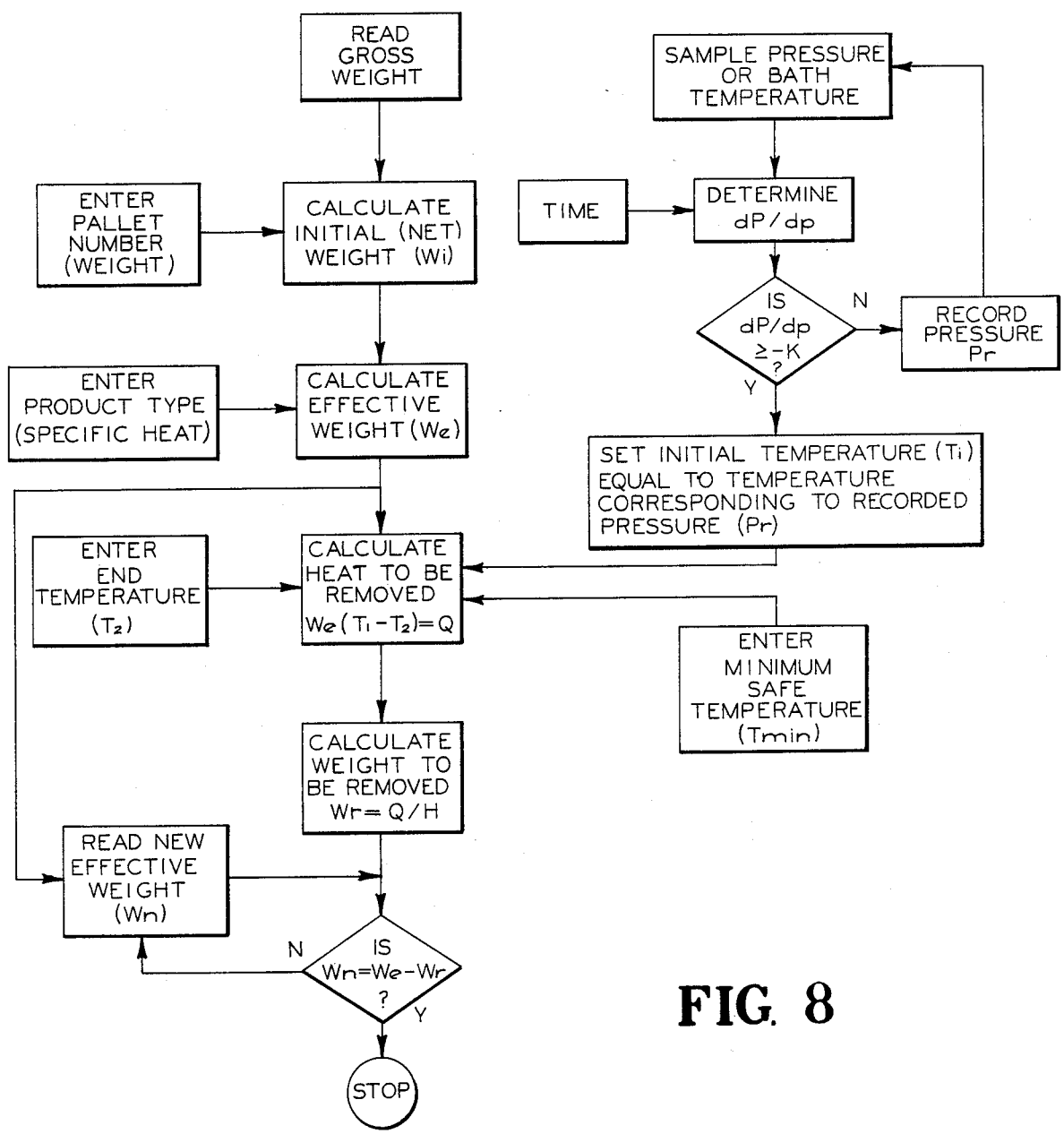
FIG. 8 is a flow chart which relates the various steps and calculations of a vacuum cooling cycle microprocessor incorporating the instant invention.

As FIG. 7 illustrates, however, the heat of vaporization H of water varies with pressure. Since the heat of vaporization H is not constant, it is most accurately represented and calculated within the microprocessor 74 as the result of an integration. The integral $$H = \int_{T_2}^{T_1} h\,dt$$

as referred to temperature, or $$H = \int_{P_2}^{P_1} h\,dp$$

as related to pressure represents the ideal manner of determining the heat of vaporization of the water evaporated or boiled away from the produce. However, since such boiling will repeatedly occur generally in heat range from approximately 80° to approximately 35°, a numerical value representing the average heat of vaporization or an empirically selected latent heat value may be utilized in the microprocessor 74 to approximate the above-noted integrals. For purposes of simplification in FIG. 8, it will be noted that the heat of vaporization is illustrated as being a temperature and pressure independent quantity. The integration technique described above will provide the most accurate vacuum cooler operation and, it must be appreciated that the preferred manner of microprocessor calculation relating to the actual heat of vaporization of water across the operating range will utilize integration techniques.

Having calculated the weight of water to be removed from the produce, the final operative step is simply to determine when such weight reduction has been achieved. This can be simply done by the microprocessor 74 by an iterative calculation process which continually monitors the weight of the produce which is constantly provided by the load cells 50 and determines when the produce has undergone the proper amount of weight reduction such that the current or new effective weight $W_n$ is equal to the initial effective weight $W_e$ minus the weight to be removed, that is, $$W_n = W_e - W_r.$$

When such weight reduction has been achieved, the microprocessor 74 provides a signal to the compressor 30 and the vacuum pump 20 to cease operation and further provide the signal to the vacuum release 22 to open and permit the ingress of air into the vacuum chamber 16.

Figure 5:
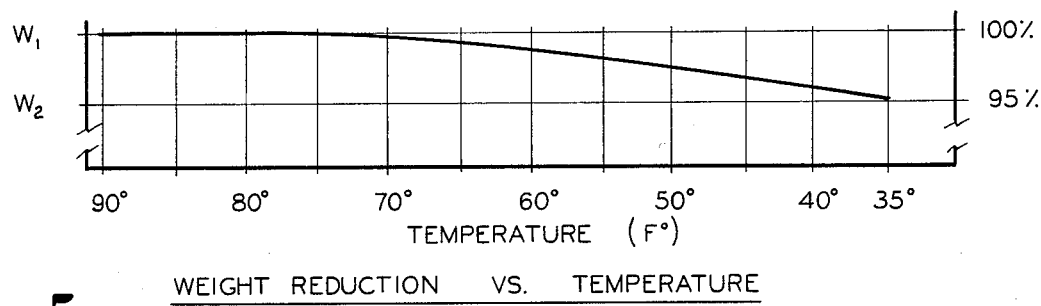
FIG. 5 is a graph illustrating a typical weight loss of a load of produce during a vacuum cooling cycle.

The immediately preceding discussion relating to weight reduction of the produce assumes that the weight to be cooled by the vaporization or boiling of water remains constant during the vacuum cooling cycle. This, of course, is not the case inasmuch as the release of water from the produce reduces the remaining amount of water and thus total produce weight which must be further cooled. Reference to FIG. 5 will illustrate this fact. Thus, in fact, the weight of the produce to be cooled is not constant but decreases with the amount of heat removed by virtue of the amount of water evaporated therefrom. This relationship, like the heat of vaporization of water varying with temperature and pressure, again is most accurately calculated and determined by the microprocessor 74 through the use of integration techniques.

The most accurate calculation through the use of integration relating to the quantity of heat to be removed is thus $$Q = (T_1 - T_2) \int_{W_1}^{W_2} W\, dw.$$

This situation, as noted, is graphically illustrated in FIG. 5 wherein the weight of the produce drops during the vacuum cooling process. Most accurately, this weight loss and the reduced amount of heat necessary to cool the produce because of its constantly reducing weight is determined through integral calculus as noted. However, since again initial temperatures, final temperatures and specific heats of the products typically vacuum cooled all fall within relatively well defined limits and since it is acknowledged that approximately one percent of the initial product weight is lost through vaporization to reduce the temperature of the produce by approximately 10°, a nominal weight loss of a constant five percent will provide an approximation if it is desired to utilize a microprocessor 74 of less sophistication than a unit having integrating capabilities.

It will thus be appreciated that a vacuum cooler and controller apparatus 10 according to the instant invention provides a fully automatic means whereby a plurality of pallets 46 containing a plurality of cartons 48 containing produce may be loaded into a vacuum chamber 16. Preferably, the pallets 46 will be of a standardized, uniform weight and simply by entering the number of pallets 46 disposed on the platform 44, the product type, a minimum safe temperature and an end temperature, the vacuum cooler operation may be initiated. Alternatively, the actual weight of the pallets 46 may be entered and the actual specific heat of the product may be entered. The vacuum cooling operation is initiated by activation of the vacuum pump 20, closure of the vacuum release 22, activation of the compressor 30, a sump pump 38 and the heater element 66 in the pressure sensing assembly 60. As the pressure within the vacuum chamber 16 decreases and the temperature within the pressure sensing assembly 60 increases, a point will be reached wherein the fluid will begin to boil. The temperature thereof will then decrease due to the slowly reducing pressure within the chamber 16 and the slowly reducing boiling point of the fluid. This condition will continue until the pressure of the air within the vacuum chamber 16 decreases to the point that water contained within the produce at its initial temperature begins to boil. At this time, the graph of pressure versus time within the vacuum chamber will exhibit a distinct inflection point which will be sensed by the microprocessor circuitry and provide the initial produce temperature to appropriate calculating components of the microprocessor 74. The actual amount of heat and thus weight loss required to reduce the temperature of the produce from its initial temperature to a desired final temperature with consideration given to the specific heat of the product and integration treatment given to both the constantly reducing weight of produce within the chamber 16 and the constantly changing heat of vaporization of the water is preferably utilized to determine the final desired weight of the produce. The produce weight is, of course, monitored and provided at all times to the microprocessor 74 by the load cells 50. Upon the attainment of the desired final weight, the produce, due to the evaporative cooling of a quantity of water from the produce, will be at the desired final temperature and the vacuum cooling cycle will be automatically terminated. Finally, atmospheric air is allowed to re-enter the vacuum chamber 16 through the vacuum release 22.

It should also be appreciated that the vacuum cooler and control assembly 10 according to the instant invention may readily be retrofitted to existing equipment. Such a retrofit would encompass, first of all, the disposition of a suitable number of load cells 50 between the existing floor of a vacuum chamber and the chamber wall such that the weight of the produce disposed on the floor could be determined and monitored throughout the vacuum cooling cycle. If the construction of the existing vacuum cooler were such that incorporation of load cells in this manner were not possible, a second floor above the existing floor of the vacuum cooler could be constructed and the load cells disposed between the existing floor and newly added floor. In addition to weight sensors, the installation of a pressure sensing assembly of either the liquid bath type or a direct pressure sensor would be necessary such that the pressure within the vacuum cooler could be monitored during the cooling cycle. Finally, of course, a microprocessor 74 and its associated equipment and control mechanism would need to be fitted to the existing equipment. It should be apparent that existing equipment of all designs is amenable to control and automatic cycling under the control scheme herein disclosed.

The foregoing disclosure is the best mode devised by the inventor for practicing this invention. It is apparent, however, that processes and apparatus incorporating modifications and variations will be obvious to one skilled in the art of vacuum cooling. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

What is claimed is:

1. A method for controlling a vacuum cooling chamber to reduce the temperature of a quantity of produce to a preselected final temperature comprising the steps of:

determining the weight of such produce;

determining the initial temperature of said produce by monitoring the rate of change of vacuum in such chamber;

determining the weight of water to be removed from such produce to reduce the temperature of such produce from such initial temperature to such preselected temperature; and vaporizing water from such produce by drawing a vacuum on such produce until such weight reduction is achieved.

2. The method of claim 1 further including the step of determining the quantity of heat to be removed to reduce the temperature of such produce from such initial temperature to such preselected final temperature.

3. The method of claim 1 further including the step of repeatedly determining the weight of such produce and correcting the weight of such water to be removed in accordance with the reducing weight of such produce.

4. The method of claim 1 further including the step of providing a quantity of liquid exposed to such vacuum, providing a source of heat to such quantity of liquid and monitoring the rate of change of temperature of such quantity of liquid.

5. The method of claim 4 wherein such liquid is water.

6. A method for controlling a vacuum cooler having a chamber for receiving a quantity of produce comprising the steps of:

determining the weight of such produce;

determining the initial temperature of such produce by monitoring the rate of change of vacuum in such chamber;

selecting a final temperature of said produce;

determining the quantity of heat to be removed to reduce the temperature of such produce from such initial temperature to such final temperature;

determining the weight of water to be removed from such produce to effect such temperature reduction; and drawing a vacuum on such produce and vaporizing water from such produce until such predetermined weight reduction is achieved.

7. The method of claim 6 wherein said initial temperature is an average temperature.

8. The method of claim 6 further including the step of providing a quantity of liquid exposed to such vacuum, providing a source of heat to such quantity of liquid and monitoring the rate of change of temperature of such quantity of liquid.

9. The method of claim 8 wherein such liquid is water.

10. The method of claim 6 further including the steps of providing a platform for receiving such produce within such chamber and providing means for determining the weight of such produce.

11. The method of claim 6 further including the step of repeatedly determining the weight of such produce and correcting the weight of such water to be removed in accordance with the reducing weight of such produce.

12. An apparatus for vacuum cooling produce to a preselected final temperature comprising, in combination, a vacuum chamber having a vacuum creating device communicating therewith, means for determining the weight of produce disposed within said vacuum chamber;

means for determining the initial temperature of such produce including a liquid bath, means for providing heat to said liquid bath and means for determining the rate of change of temperature of said liquid; and means for determining the weight of water to be removed from such produce to reduce the temperature of such produce from said initial temperature of said preselected final temperature.

13. The apparatus of claim 12 further including means for removing heat from said vacuum chamber.

14. The apparatus of claim 12 wherein said means for measuring the weight of material disposed on such platform means includes a plurality of load cells.

15. The apparatus of claim 12 wherein said liquid is water.

16. The apparatus of claim 12 wherein said means for determining the initial temperature of such produce includes means for sensing the pressure within said chamber and means for determining the rate of change of such sensed pressure.

17. The apparatus of claim 12 further including data entry means for providing information to said determining means regarding the tare weight of produce containers and information relating to the specific heat of such produce.

18. The apparatus of claim 12 further including means for determining the amount of heat to be removed to reduce the temperature of such produce from said initial temperature to said final temperature.

19. In an apparatus for vacuum cooling produce including a vacuum chamber having a platform for receiving produce, a device for creating a vacuum within such chamber and a refrigeration assembly having evaporator coils within such vacuum chamber for removing heat therefrom, the improvement comprising:

means for determining the weight of material disposed on such platform;

means for determining the initial temperature of such produce including a quantity of liquid exposed to such vacuum, means for providing heat to said liquid and means for monitoring the temperature of said liquid; means for determining the quantity of heat to be removed from such produce to reduce the temperature of such produce from said initial temperature to a predetermined final temperature; and means for determining the weight of water to be removed from such produce to effect such temperature reduction.

20. The improvement of claim 19 further including means for accepting information relating to the tare weight of containers of such produce and means for determining the net weight of such produce.

21. The improvement of claim 19 wherein said means for determining the initial temperature of such produce includes means for determining the rate of change of pressure within the vacuum chamber.

22. The improvement of claim 19 wherein said liquid is water.

* * * * *